United States Patent [11] 3,633,200

[72] Inventors Victor D. Ellison
 Waverly;
 Casimer F. Remus, Tunkhannock, both of Pa.
[21] Appl. No. 854,483
[22] Filed Sept. 2, 1969
[45] Patented Jan. 4, 1972
[73] Assignee The Bendix Corporation

[54] VERTICAL SCALE INDICATOR
 16 Claims, 10 Drawing Figs.
[52] U.S. Cl. .................................................... 340/317,
 73/432 A, 340/187
[51] Int. Cl. ....................................................... G08c 19/38,
 G08b 23/00
[50] Field of Search ......................................... 73/432 IA,
 432 A, 178; 33/138; 116/129 N; 340/184, 315,
 316, 317, 187; 318/626; 242/107

[56] References Cited
 UNITED STATES PATENTS
 1,787,298 12/1930 Ziola ............................ 116/124.5
 2,744,489 5/1956 Gallant ......................... 116/129

Primary Examiner—Louis R. Prince
Assistant Examiner—Daniel M. Yasich
Attorneys—S. H. Hartz and Plante, Hartz, Smith & Thompson ABSTRACT: A vertical scale indicator has a scale, and a pair of mechanism assemblies positioned side-by-side with indices on flexible bands moving along opposite sides of the scale to indicate conditions. Each mechanism assembly comprises a mounting plate having thereon a follow up with a pulley, a servomotor driving the follow up and pulley in one direction, and a return spring assembly with a drum driven in the opposite direction by a spring. The flexible band is connected to the pulley and the drum and is moved in one direction by the motor and in the opposite direction by the return spring assembly.

INVENTORS
VICTOR D. ELLISON
CASIMER F. REMUS
BY
ATTORNEY

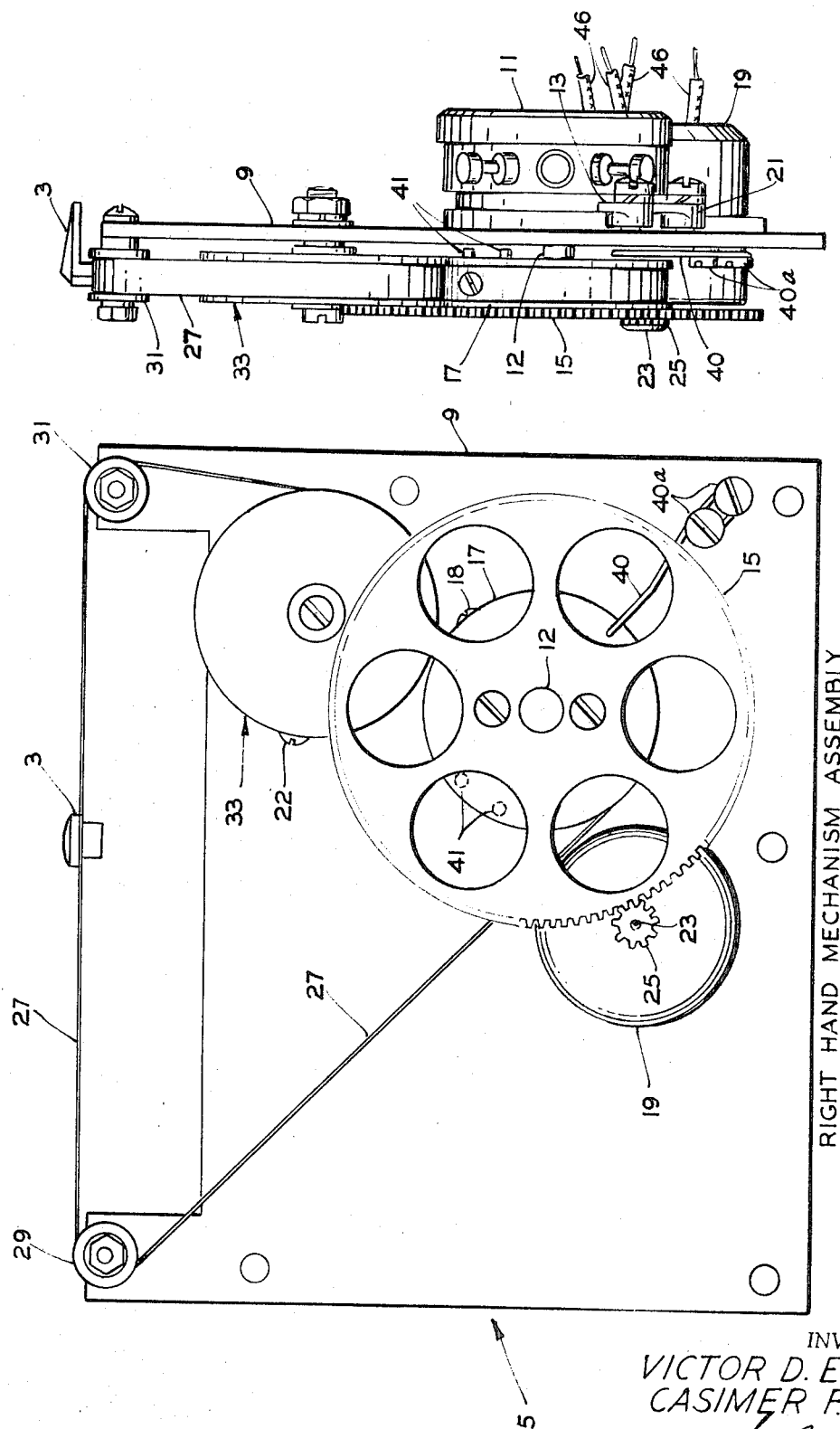

LEFT HAND MECHANISM ASSEMBLY

INVENTORS
VICTOR D. ELLISON
CASIMER F. REMUS
BY [signature]
ATTORNEY

VERTICAL SCALE INDICATOR

The invention relates to indicators especially adapted for aircraft and more particularly to vertical scale indicators.

The control panel of an aircraft is overcrowded with instruments because of the many conditions which must be made known to the pilot. Circular instruments were used heretofore and in some instances are still used, but the trend is toward vertical scale instruments because they conserve space, can be arranged more orderly, and are easier to read.

Servoed indicators are more desirable than meter movement indicators because they are inherently more rugged and operate at higher torque levels. Because of this, the servoed indicators are highly desirable for use in vibration and acceleration environments encountered in aircraft applications and particularly helicopters. The importance of friction levels, dial to pointer clearances and pointer unbalance is greatly diminished in servoed indicators as opposed to the meter movement types. Another advantage of the servoed indicators is that they are better suited to the required flat cover glass and dial presentation. Furthermore, servoed indicators hold their initial factory calibration for long periods of time and do not require external zero adjustment provisions.

Servoed indicators as used heretofore required substantial space for the components so that even vertical scale indicators were relatively large in size and continued to occupy a substantial amount of space on the instrument panel. Furthermore, their operation was somewhat complex and they were expensive to manufacture.

One object of the present invention is to provide a vertical scale indicator which is relatively inexpensive to manufacture, small in size, and easy to read.

Another object of the invention is to provide a vertical scale indicator especially adapted for multiengine aircraft where similar parameters are indicated for two or more engines.

Another object of the invention is to provide a vertical scale indicator in which the index automatically moves off the scale and a warning flag appears when a power off condition occurs.

Another object of the invention is to provide a vertical scale indicator which operates at low temperatures with minimum power.

The invention contemplates a vertical scale indicator having a single scale with an index at each side of the scale for indicating a parameter for each of two devices, such as engine temperature for two engines. Each pointer is operated by a mechanism assembly which includes a mounting plate, a followup with a pulley mounted on the plate, a servomotor mounted on the plate for operating the followup and pulley in one direction and a return spring assembly mounted on the plate and having a drum driven in the opposite direction by a spring. A flexible band has the index thereon and is mounted on the pulley and the drum and is driven in the one direction by the motor and in the opposite direction by the return spring assembly.

These and other objects and advantages of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In the drawings

FIG. 3 is a side view of a right-hand mechanism assembly shown in FIG. 2.

FIG. 4 is a bottom view of the mechanism assembly shown in FIG. 3,

Figure 1:
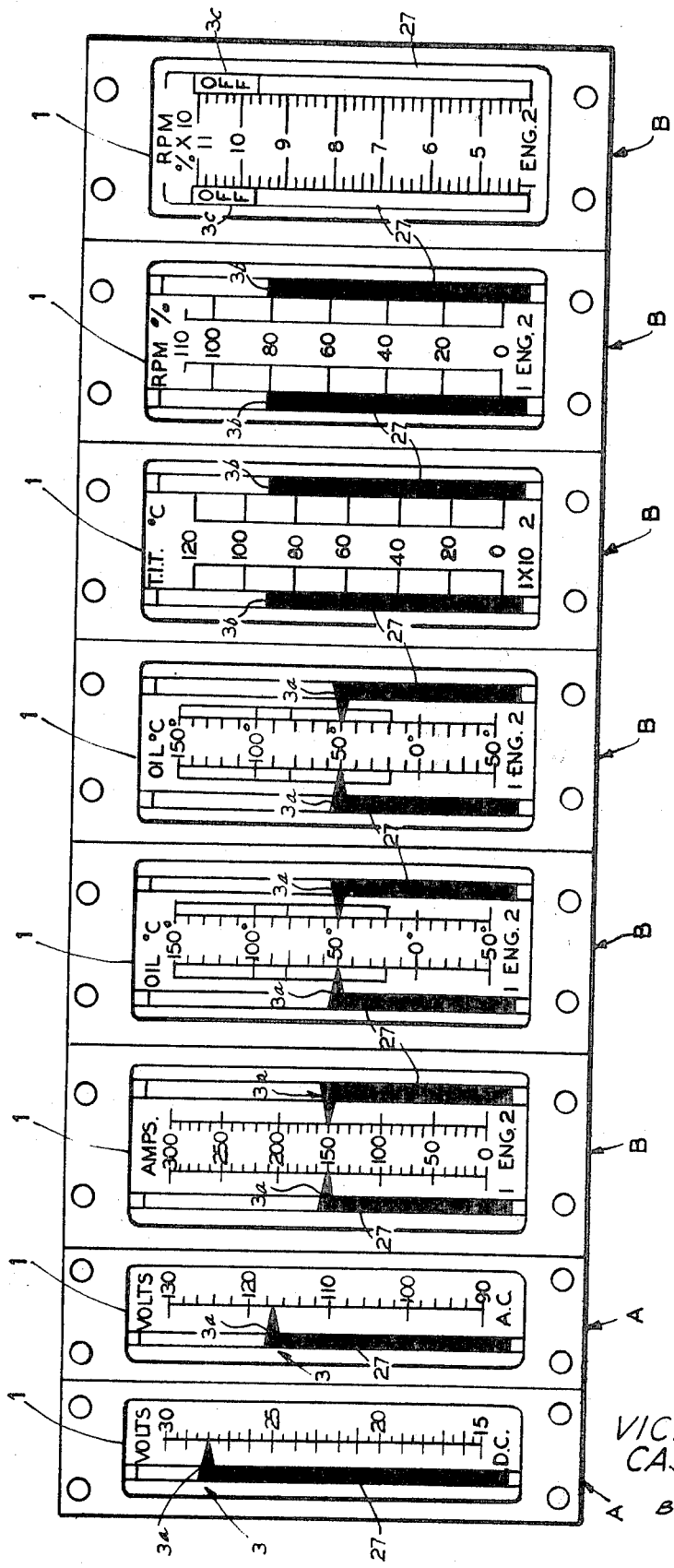
FIG. 1 is a front view of a cluster of vertical scale indicators constructed according to the invention.

The cluster of novel vertical scale indicators shown in FIG. 1 and constructed according to the invention is shown as it appears to the pilot of an aircraft on the instrument panel and each indicator comprises a scale 1 with indicia thereon corresponding to the condition to be indicated. Indicators A have only a single index 3 at one side of the scale and each indicator B has an index 3 at each side of the scale. In some of the indicators A and B, the index is a pointer 3a on a flexible band 27 and in the remainder the index is a line 3b on the band and the band preferably is of one color below the line and another color above the line to facilitate reading the indicator. Each index moves vertically independently in response to a condition. In the dual indicators B, one index may indicate oil pressure of one engine and the other index may indicate oil pressure of a second engine. If the aircraft has four engines then two dual vertical scale indicators are used to indicate this parameter for the four engines. In case of power failure the index automatically moves off the scale and a warning flag 3c appears which may be the word "OFF" as shown in the right-hand indicator B in FIG. 1.

Flexible bands 27 are included in right-hand mechanism assemblies 5 and left-hand mechanism assemblies 7, to the right or left of a mounting plate 9, as shown in FIGS. 3 to 6, according to the side of the scale on which the index is located. Each mechanism assembly comprises a followup potentiometer 11 mounted on one side of plate 9 by clamps 13 and with a shaft 12 extending through an aperture in the plate. A gear 15 is mounted on a pulley 17 and the gear and pulley are mounted on the potentiometer shaft 12 on the side of the plate opposite to potentiometer 11. A servomotor 19 is mounted by clamps 21 in an aperture in the plate so that the motor extends through the plate and has a shaft 23 mounting a pinion 25 meshing with gear 15. The motor drives pulley 17 and operates potentiometer 11 in one direction. Flexible band 27 has one end attached to pulley 17 by a screw 18. The flexible band is guided by ball bearing rollers 29 and 31 rotatably mounted at the corners of mounting plate 9 adjacent to scale 1 on the same side of plate 9 as pulley 17. The opposite end of flexible band 27 is attached by a screw 22 to a spring assembly 33 mounted on the same side of mounting plate 9 as pulley 17.

Figure 7:
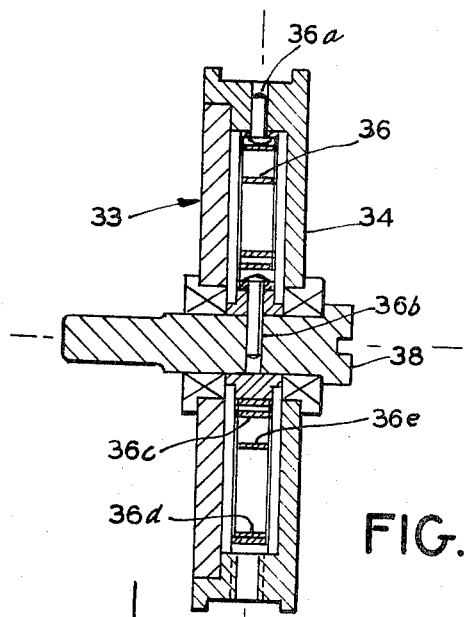
FIG. 7 is a vertical section through the return spring assembly taken on line 7—7 of FIG. 5.
Figure 8:
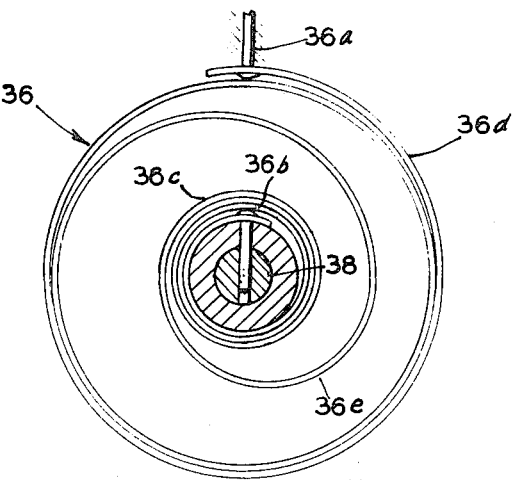
FIG. 8 shows the spring and associated structure of the return spring assembly.
Figure 9:
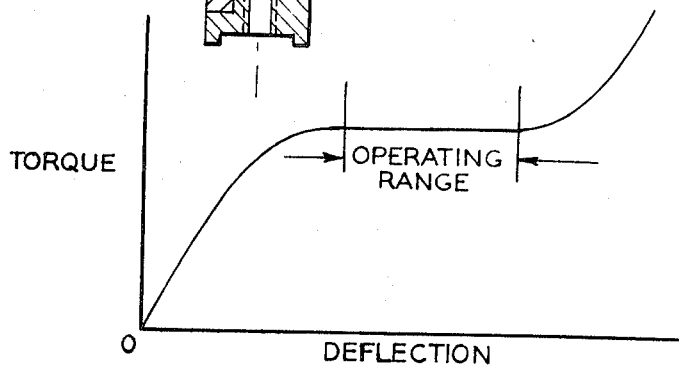
FIG. 9 is a graph showing the torque vs. deflection curve of the return spring assembly.

The spring assembly shown in detail in FIGS. 7 and 8 comprises a hollow drum or pulley 34 having a clock spring 36 therein with one end fastened to the pulley by a pin 36a and the opposite end fastened to hub 38 of pulley 34 by a pin 36b. The spring preferably has a number of inner end turns 36c adjacent hub 38 and a number of outer end turns 36d adjacent the rim of pulley 34 and one or more turns 36e therebetween and is of sufficient length so that only the turn or turns 36e of the spring between the inner end turns 36c and the outer end turns 36d are active in effecting movement of the pulley to provide a uniform force on band 27 over the entire operating range as shown by the torque-deflection curve in FIG. 9, irrespective of the angular position of pulley 34.

Servomotor 19 drives flexible band 27 and moves index 3 along scale 1 in one direction and spring assembly 33 drives flexible band 27 and moves index 3 along scale 1 in the opposite direction. Movement of index 3 is linear and spring assembly 33 always opposes servomotor 19. Movement of index 3 is limited by a stop 40 attached to plate 9 by screws 40a and cooperating with pins 41 on pulley 17. The diameter of pulleys 17 and 34 and the positions of pins 41 and stop 40 preferably are selected so that one revolution of pulleys 17 and 34 permits full scale travel of the index and allows warning flag 3c, to appear and index 3 to move off the scale when power is removed from servomotor 19 either intentionally or otherwise. Stop 40 preferably is flexible to absorb the impact which may result during transients or power failure.

Figure 2:
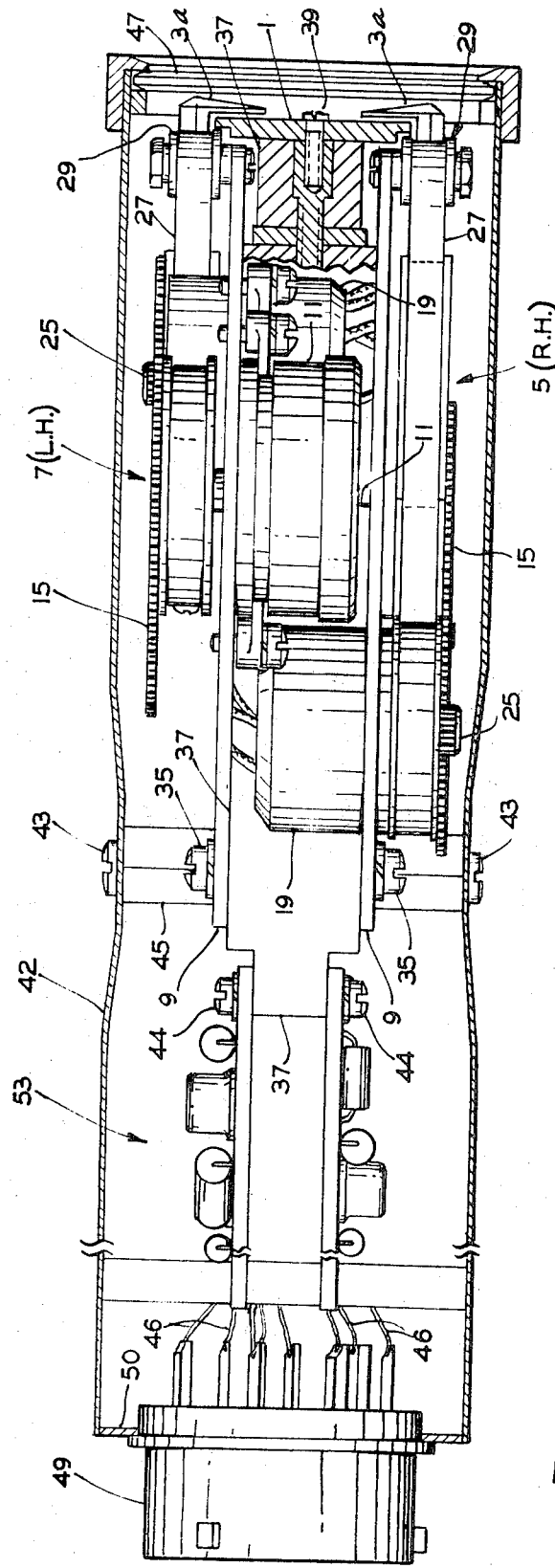
FIG. 2 is a top view of one of the dual vertical scale indicators shown in FIG. 1.
Figure 6:
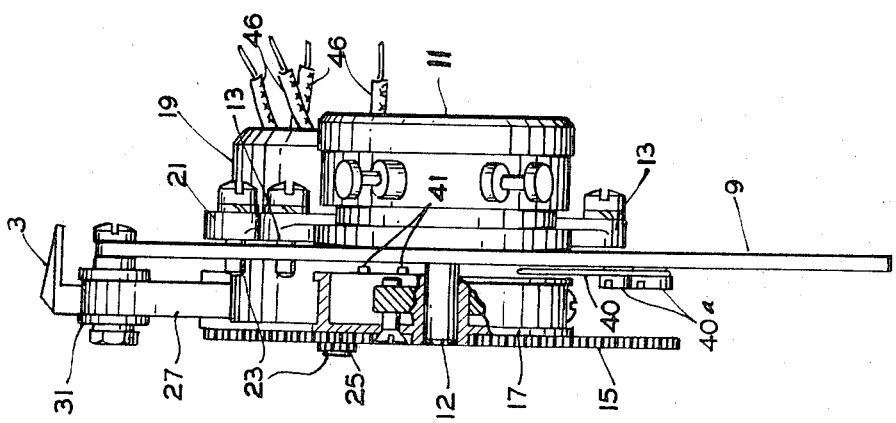
FIG. 6 is a top view of the mechanism assembly shown in FIG. 5.
Figure 5:
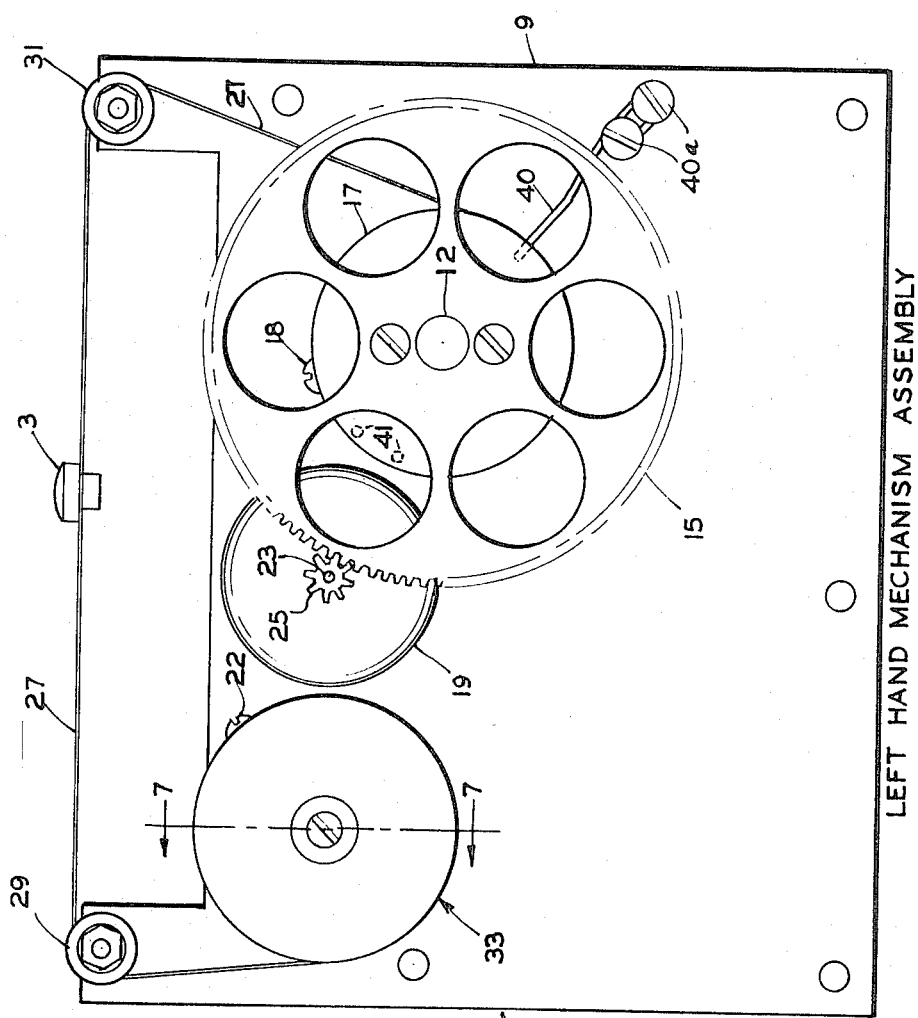
FIG. 5 is a side view of a left-hand mechanism assembly shown in FIG. 2.

As shown in FIG. 2, the right-hand mechanism assembly 5 and the left-hand mechanism assembly 7, when assembled in the indicator, are held together by screws 35 extending through apertures in mounting plates 9 and threaded in spacers 37 between the mounting plates. The mechanism assemblies are assembled with potentiometer 11 and servomotor 19 of each assembly positioned between the mounting plates. It will be observed that potentiometers 11 and servomotors 19 are positioned on mounting plates 9 so that there is no interference between the servomotor and potentiometer of the right-hand mechanism assembly with corresponding parts on the left-hand mechanism assembly when the mechanism assemblies are attached together in the manner described. This arrangement makes it possible to reduce the width of the vertical scale indicator to a minimum.

Scale 1 is attached by screws 39 to spacers 37. The mechanism assemblies are mounted in a casing 42 by screws 43 threaded into posts 45. A cover glass 47 is positioned at one end of the casing for viewing scale 1. An amplifier 53 for each mechanism assembly is positioned in the casing to the rear of the mechanism assemblies and is attached by screws 44 to spacer 37. The amplifiers and servomotors are connected electrically by leads 46 to an electrical connector 49 installed in the rear wall 50 of the casing.

Figure 10:
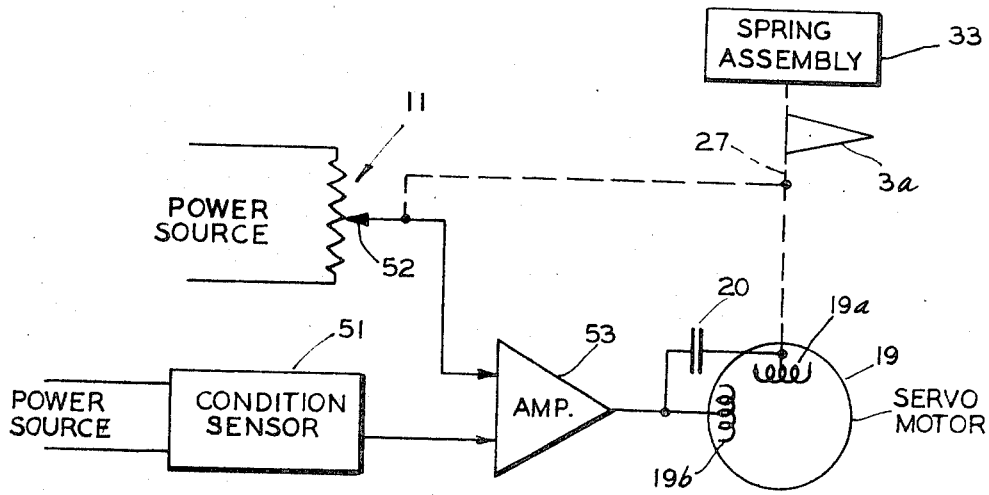
FIG. 10 is a schematic wiring diagram showing the electrical circuit of the mechanism assemblies.

Referring to FIG. 10, a condition sensor 51 for sensing oil temperature, oil pressure, or the like, is connected to a power source and provides an electrical signal corresponding to the sensed condition. Followup potentiometer 11 has a movable tap 52 drivably connected by gear 15 and pinion 25 (shown by the dotted line) to servomotor 19 and by flexible band 27 to spring assembly 33. Followup potentiometer 11 is electrically connected to the power source and with condition sensor 51 to the input of amplifier 53 where the condition signal and followup signal are algebracially summed. Servomotor 19 is connected to the output of amplifier 53 and drives flexible band 27 and movable tap 52 of potentiometer 11 in one direction to a null whereupon the servoamplifier output produces a motor torque which balances the spring torque. Upon a change in the condition with a corresponding change in the signal from sensor 51, when the spring torque exceeds the motor torque, then spring assembly 33 moves flexible band 27 and potentiometer tap 52 to a new null position until the output of amplifier 53 is adjusted so the motor torque again balances the spring torque. In case of power failure, spring assembly 33 automatically moves index 3a off the scale and warning flag 3c on flexible band 27 appears.

Servomotor 19 preferably is a two phase motor and both phases 19a and 19b are connected to the output of amplifier 53 with a condenser 20 in series with phase 19a. This arrangement enables the indicator to operate with very low power dissipation and results in cool operation of the servomotor.

A vertical scale indicator constructed according to the invention is relatively inexpensive to manufacture, small in size and easy to read and is especially adapted for use in multiengine aircraft.

While the indicator is referred to as a vertical scale indicator, the term vertical is not intended to restrict the use of the indicator to a vertical position on the instrument panel, since the indicator may also be positioned horizontally on the instrument panel. The word vertical is used to describe the rectilinear movement of the indicator. Also, while the indicator shown and described herein has a stationary scale, and a movable index on the flexible band, it should be understood that the index may be stationary and the scale may be on the flexible band and move relative to the index.

Although only one embodiment of the invention has been illustrated and described, various changes in the form and relative arrangements of the parts, which will now appear obvious to those skilled in the art may be made without departing from the scope of the invention. Reference is, therefore, to be had to the appended claims for a definition of the limits of the invention.

What is claimed is:

1. In an indicator of the kind described comprising scale means and index means movable relative to one another for indicating a condition sensed by a signal condition device, a mechanism assembly having a single mounting plate, followup means mounted on said plate for providing signals corresponding to the relative positions of the scale means and index means, a pulley mounted on the followup means, a servomotor mounted on said plate and drivably connected to operate the followup means and pulley in one direction and responsive to signals from the signal condition device and followup means, a return spring assembly mounted on said plate and having a drum driven in the opposite direction by a spring, and a flexible band having one of the scale means or index means thereon and drivably connected to the pulley and to the drum and driven in the one direction by the motor and in the opposite direction by the return spring assembly, the other of said scale means or index means being fixed relative to said mounting plate, so that the scale means and index means cooperate to indicate a value on the scale.

2. An indicator of the kind described in claim 1 in which the drum and pulley are mounted on the same side of the plate and the flexible band is secured to the drum and pulley proximate its opposite ends.

3. An indicator of the kind described in claim 1 which includes means for guiding the flexible band.

4. An indicator of the kind described in claim 1 which includes a pair of mechanism assemblies positioned side by side with said one of said scale means or index means of each of said assemblies positioned at opposite sides of the other of said scale means or index means, the motor and followup means of each mechanism assembly extending outwardly of one side of the associated plate and being arranged so that the motors and followup means of the pair of mechanism assemblies are positioned between the plates and are offset so that the plates when assembled are spaced a distance substantially equal to the width of the followup means.

5. An indicator as described in claim 1 having stop means to limit movement of the flexible band by the return spring assembly when the motor is deenergized.

6. An indicator of the kind described in claim 5 which includes a warning flag on the flexible band which appears when the motor is deenergized and the band is moved by the return spring assembly to its limit of travel in one direction.

7. An indicator of the kind described in claim 1 which includes an amplifier having an input connected to the condition signal device and to the followup means and responsive to the signals therefrom and having an output connected to the motor for operating the motor in opposition to the spring.

8. An indicator of the kind described in claim 7 in which the motor is a two-phase motor and both phases are energized by the amplifier.

9. A mechanism assembly for an indicator of the kind described for indicating a condition sensed by a signal condition device, comprising a single mounting plate, followup means mounted on, said plate and operable for providing signals, a pulley mounted on the followup means, a servomotor mounted on said plate and drivably connected to operate the followup means and pulley in one direction in response to signals from the signal condition device and followup means, a return spring assembly mounted on said plate and having a drum driven in the opposite direction by a spring, and a flexible band for providing an indication of the condition mounted on the pulley and the drum and driven in the one direction by the motor and in the opposite direction by the return spring assembly.

10. A mechanism assembly of the kind described in claim 9 in which the return spring assembly provides a constant force opposing the motor.

11. A mechanism assembly of the kind described in claim 9 in which the motor is a two-phase motor and both phases are energized by an amplifier connected to the signal condition device and followup means.

12. A mechanism assembly as described in claim 9 in which the followup is positioned on one side of the plate, and the pulley and return spring assembly are positioned on the opposite side of the plate.

13. A mechanism assembly as described in claim 12 in which the motor extends through an aperture in the plate and gearing drivably connects the motor to the pulley and followup means.

14. An indicator having scale means and index means movable relative to one another, and including a pair of mechanism assemblies as described in claim 9 positioned side by side and having said one of said scale means or index means on each flexible band of each of said assemblies positioned at opposite sides of the other of said scale means or index means, the motors and followup means of the mechanism assemblies being positioned between the plates and the motor and followup means of one mechanism assembly being offset from the motor and followup means of the other mechanism assembly.

15. An indicator as described in claim 14 in which the plates are spaced a distance substantially equal to the width of a followup means.

16. An indicator as described in claim 15 in which the plates are secured to one another substantially parallel to one another.

* * * * *